L. A. LAURSEN.
SPEED INDICATOR FOR CENTRIFUGAL MACHINES.
APPLICATION FILED JULY 9, 1908.

925,641.

Patented June 22, 1909.
2 SHEETS—SHEET 1.

Witnesses
C. E. Smith
S. E. Dodge

Inventor
L. A. Laursen,
By Beeler & Robb
Attorneys

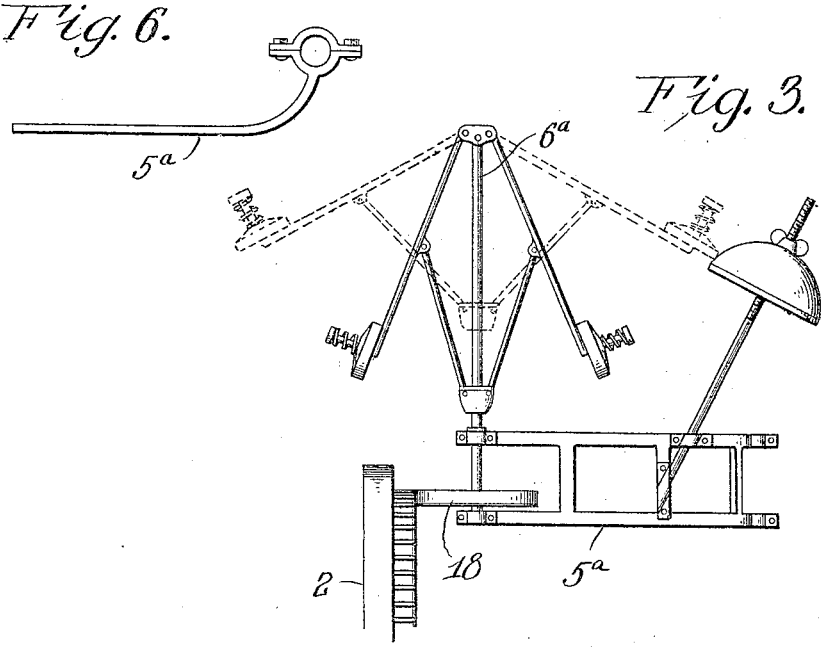

UNITED STATES PATENT OFFICE.

LAURITS AKSEL LAURSÈN, OF CORNELL, WISCONSIN, ASSIGNOR OF ONE-HALF TO EDWARD FALBE, OF HOLCOMBE, WISCONSIN.

SPEED-INDICATOR FOR CENTRIFUGAL MACHINES.

No. 925,641.     Specification of Letters Patent.     Patented June 22, 1909.

Application filed July 9, 1908. Serial No. 442,725.

*To all whom it may concern:*

Be it known that I, LAURITS AKSEL LAURSÈN, a citizen of the United States, residing at Cornell, in the county of Chippewa and State of Wisconsin, have invented certain new and useful Improvements in Speed-Indicators for Centrifugal Machines, of which the following is a specification.

This invention comprises a novel form of speed indicator for centrifugal machines particularly.

The invention is designed especially for use in connection with centrifugal cream separators. As is well known in the operation of cream separators of the above type the best results are obtained from the machine when the same is operated at a certain speed.

The present invention consists of an attachment so constructed as to be readily applied to a separator and operated thereby to indicate when the machine is being driven at the proper speed to secure the best results in the separation of the cream from the milk.

For a full understanding of the invention reference is to be had to the following detail description and to the accompanying drawings, in which—

Figure 1:
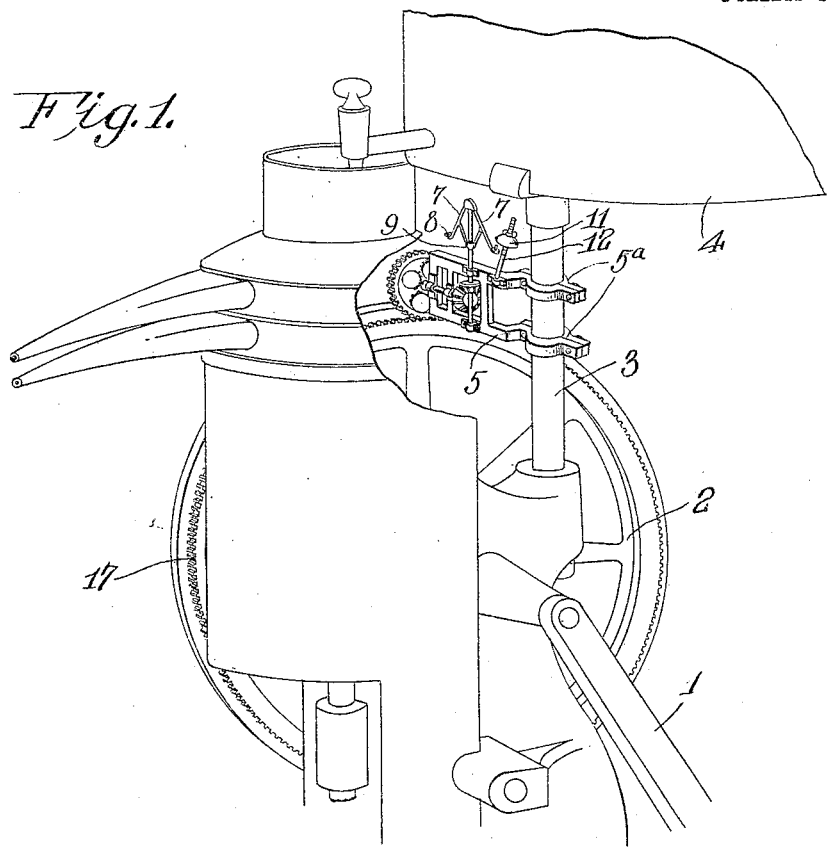
Figure 2:
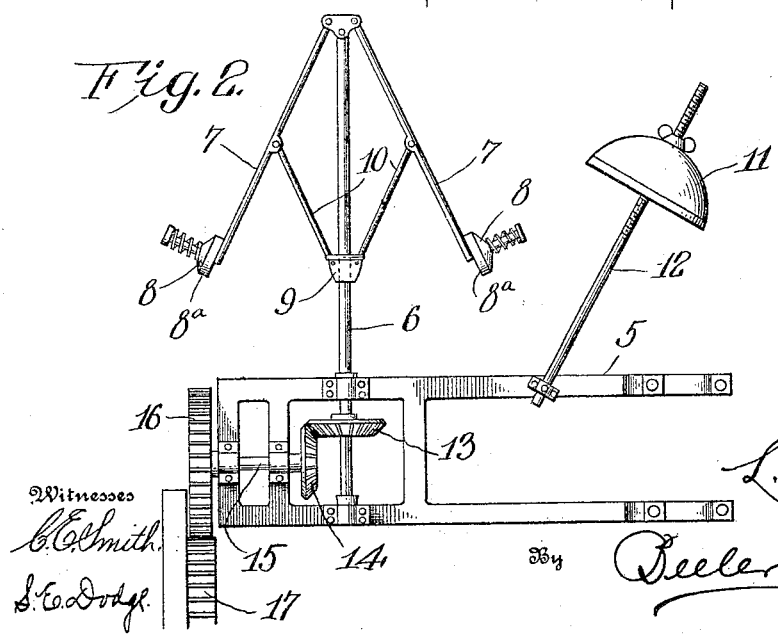

Figure 1 is a view showing the invention applied to an ordinary form of cream separator; Fig. 2 is a view of the attachment alone; Fig. 3 is a side elevation of a modification of the invention, Fig. 4 shows a further modification of the invention, in top plan view; Fig. 5 is a side elevation of the modification in Fig. 4, and Fig. 6 is a detail view of the supporting frame.

Throughout the following detail description and on the several figures of the drawings similar parts are referred to by like reference characters.

Specifically describing the invention and referring to Fig. 1 of the drawings particularly, the cream separator illustrated is of a conventional type embodying a suitable operating handle 1 for driving the separator bowl at high speed, a fly wheel 2 being employed.

The invention is preferably mounted upon a supporting post 3 which carries the milk receptacle 4 from which the milk passes to the separator bowl in the operation of the machine.

It is contemplated that the mechanism included in the present invention shall be operable by some driven part of the mechanism of the cream separator.

The invention consists of a frame 5 of somewhat rectangular form, said frame being attached at one end, by means of plates $5^a$ to the supporting post 3. Mounted on the frame 5 is a vertical spindle 6 to which are pivoted centrifugal arms 7 at the lower ends of which are carried weights 8. The weights 8 comprise knockers, the detail construction of which is immaterial though it may be well to state that the same comprise loose rings $8^a$ and suitable spring devices for holding said rings in normal positions. A collar 9 on the spindle 6 is connected by links 10 with the arms 7, said collar sliding freely on the spindle as the arms 7 move outwardly and inwardly by centrifugal action when the mechanism is in operation. The knockers 8 are adapted to coöperate with a bell 11, or any other suitable sounding device, said bell being adjustably mounted on a stem 12 secured to the frame 5. The bell 11 has a threaded connection with the stem 12 and is movable longitudinally thereof when being adjusted. It is desirable that the bell 11 be adjustable in order that the attachment comprising the invention may be properly applied to different machines. On the lower portion of the spindle 6 is a bevel gear 13 meshing with a similar gear 14 on a short shaft 15, the latter being arranged horizontally and mounted in suitable bearings in the frame 5. On the outer end of the shaft 15 is a gear 16 and the teeth of said gear are adapted to mesh with the teeth of a flange or ring 17 carried by the fly wheel 2 of the cream separator. The ring 17 is preferably secured to the wheel 2 by any desirable fastening devices, or it may be formed integrally.

In the actual operation of the invention it will be aparent that as the separator bowl is being driven, the fly wheel 2 is rotated at a corresponding speed and motion is transmitted from said fly wheel by means of the toothed ring 17 and gearing carried by the frame 5 to the spindle 6. The spindle 6 is then rotated and the arms 7 thereof move outwardly by centrifugal action in a manner similar to the arms of an ordinary centrifugal speed governor. When the machine is driven at a certain speed the knockers 8 carried by the arms 7 will strike the bell 11 and indicate the speed of the machine. The bell 11 will preferably be adjusted so that when the machine is driven at a speed to produce the best results, the bell will be hit by the knockers 8 during revolution of the spindle 6 and the operator will thus be made aware of the fact that the machine is being driven at the proper speed to effect the separation of the contents of the separator bowl.

In the modification of the invention illustrated in Fig. 3 the construction is substantially the same as hereinbefore described in general features. In Fig. 3, however, the gearing is dispensed with and a friction wheel 18 having a contact facing at its rim portion is mounted on the spindle 6ª. The spindle 6ª is supported by a frame 5ª similar to the frame 5 above described, and the sounding of indicating devices coöperate in substantially the manner before set forth. The friction wheel 18 is designed to be arranged upon the frame of the separator in such a way that the same is in contact with the fly wheel, or any equivalent driven element, whereby motion is imparted to the spindle 6ª and the latter driven at a speed corresponding with that of the separator mechanism.

A further modification of the invention is shown in Fig. 4. In this construction the indicating mechanism is carried by a frame 19, the spindle 6ᵇ being mounted in suitable bearings in said frame 19 and having secured thereto at its lower portion a friction wheel 20. In the outer portion of the frame 19 is mounted a second friction wheel 21 the periphery of which is in contact with the wheel 20, being held in such contact by means of spring pressed bearings 22. The frame 19 carries the stem 12ª which supports the bell 11ª, the latter being fixed in its adjustment by means of a thumb nut, or like element, indicated at 23. The centrifugal arms 7ª carried by the spindle 6ᵇ have the knockers 8ᵇ which are adapted to coöperate with the bell 11ª in the manner before described.

The modified construction of the invention shown in Fig. 4 is designed for use in connection with separating machines of a different type from that illustrated in Fig. 9. With the above in view the frame 19 is pivoted at one end, as shown at 24 to a detachable supporting frame 25. The frame 25 is adapted to embrace the lower portion of the frame work of the cream separator and is composed of sections adjustably connected as shown at 25ª, in order that the frame 25 may be applied to machines of different sizes. The friction wheel 21 is arranged upon the free end of the frame 19 and said frame is so mounted on the frame 25 that the wheel 21 may be readily disposed so as to remain in frictional contact with the driven part of the cream separator. In the construction illustrated the friction wheel 21 is adapted for contact with the spindle of the separator bowl, which is driven at high speed in the operation of the cream separator, and said wheel is held in such contact by means of a spring 26, attached to the frame 25 and the outer end of which engages the pivoted end portion of the frame 19 and holds said frame in proper position for operative contact of the wheel 21 with the bowl spindle designated 27. The frame 19, however, may be swung to one side so as to disconnect the wheel 21 from the spindle 27. The indicating mechanism may therefore be brought into and out of operation at will.

In the construction of the invention shown in Figs. 1, 2, and 3, the frames 5 and 5ª described are so mounted upon the frame work of the cream separator that they may, by pivotal movement, be thrown to one side in order to disengage the drive gears 16 and 18 from the driven parts engaged thereby when the indicating mechanism is in operation. The operation of such indicating mechanism may thus be discontinued in a manner somewhat similar to that shown in Fig. 4.

It is contemplated within the scope of the invention to modify the detail construction of the indicating devices, and supporting frame work, in order that the invention may be readily applied to machines of different types, and in order to secure the best results in the operation of the attaching device.

Having thus described the invention, what is claimed as new, is:

1. In combination with a centrifugal machine embodying a supporting post and driving mechanism including a rotary element, indicating mechanism for measuring the speed of the machine comprising a frame, a wheel mounted on said frame, means connecting the frame with the post aforesaid so as to support said wheel either in or out of contact with the rotary element of the machine, a spindle mounted in said frame, centrifugal arms connected with said spindle, means connecting the spindle and the wheel on the frame whereby the former may be actuated to rotate the spindle, a bell, and means whereby the bell is adjustably supported on the frame for coöperation with the arms of the spindle, substantially as described.

2. An indicating attachment substantially as set forth comprising a frame, means adjustably supporting said frame in operative position, a driven part a spindle mounted on the frame, gearing for connecting said spindle with the driven part, centrifugal arms carried by the spindle, knockers supported by said arms, a stem mounted on the frame in proximity to the spindle, a bell carried by said stem and adapted for contact with the knockers, and means for holding the bell at various adjustments on the stem.

In testimony whereof I affix my signature in presence of two witnesses.

LAURITS AKSEL LAURSEN.

Witnesses:
ROBT. L. ZIMMERMAN,
N. M. MARTIN.